Sept. 9, 1924.

R. E. CARTER

UNIVERSAL FLEXIBLE COUPLING

Filed March 1, 1921

1,507,767

Inventor
ROBERT E. CARTER.

By J. Dowling
Attorney

Patented Sept. 9, 1924.

1,507,767

UNITED STATES PATENT OFFICE.

ROBERT EARL CARTER, OF SYKESVILLE, MARYLAND.

UNIVERSAL FLEXIBLE COUPLING.

Application filed March 1, 1921. Serial No. 448,832.

*To all whom it may concern:*

Be it known that I, ROBERT EARL CARTER, a citizen of the United States, residing at Sykesville, in the county of Carroll and State of Maryland, have invented certain new and useful Improvements in Universal Flexible Couplings, of which the following is a specification.

This invention relates to certain new and useful improvements in universal flexible couplings, particularly serviceable for connection of rotatable members, such as motor vehicle drive shafts and the like.

The primary object of the invention is to provide a coupling of the above kind which is extremely simple and durable in construction and efficient in operation.

Another salient object of the invention is to provide an improved coupling which will provide efficient yieldable connection between two rotatable members and which will be yieldable and flexible for permitting a tolerable amount of relative endwise and lateral movement between such members.

A further object is to provide a construction for yieldably permitting universal relative movement between the members with a minimum amount of frictional resistance thereto and a consequent minimum wear and tear on the coupling parts.

Other objects will appear as the nature of the invention is better understood, and the same consists in the novel form, combination and arrangement of parts hereinafter more fully described, shown in the accompanying drawing and claimed.

Figure 1:
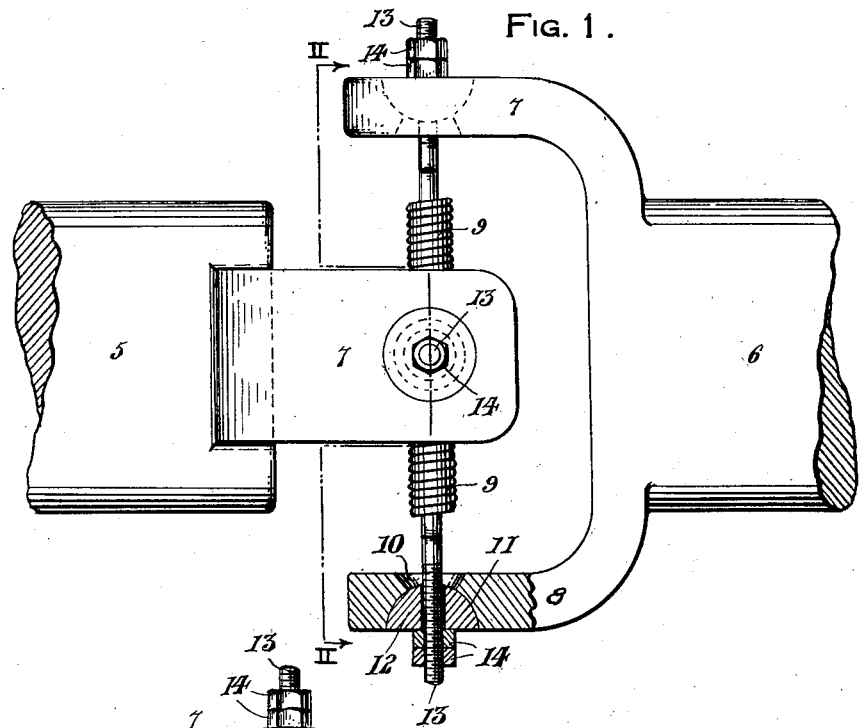
Figure 2:
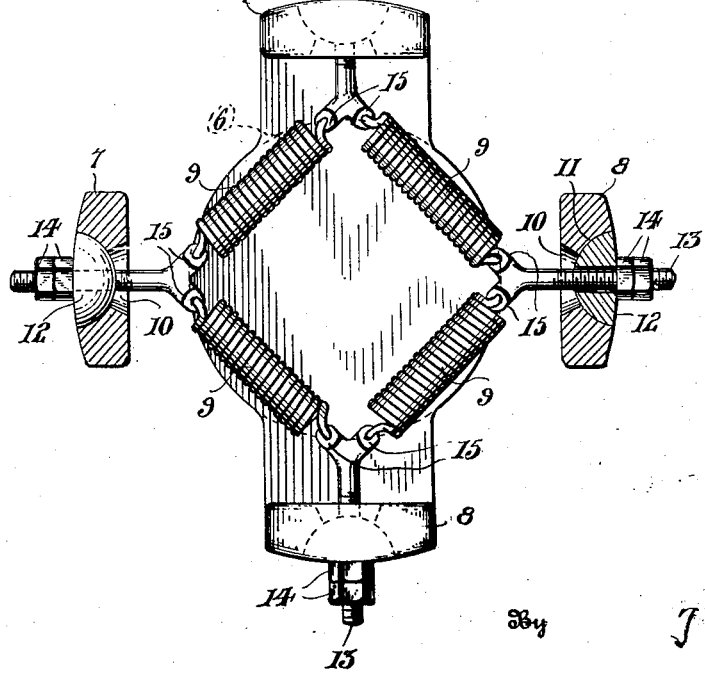

In the drawing, wherein like reference numerals indicate corresponding parts throughout the several views, Figure 1 is a fragmentary side elevational view showing an embodiment of the present invention, and, Figure 2 is a transverse sectional view taken on line II—II of Fig. 1.

Referring more in detail to the drawing, 5 and 6 indicate the rotatable members, such as the driving and driven shafts of a motor vehicle, which are connected by the coupling constituting the present invention.

A fork, composed of a pair of opposed outwardly and longitudinally extending arms 7 and 8 is rigid upon the end of each of the members 5 and 6, these forks being held normally overlapped and at right angles to each other by a series of tangentially disposed tension springs 9. Each fork arm is provided with a transverse opening near its free end as at 10, and the arms are countersunk about these openings to provide substantially hemispherical sockets 11 in the outer faces of the arms. Hemispherical or ball-like elements or members 12 are universally movable in the sockets 11, and a threaded stem 13 extends through each fork arm and its ball-like member 12, the stems being smaller than the openings 10, so that universal movement of the stems is permitted. The stems are held against inward displacement by means of nuts 14 threaded thereon, and the springs 9 are connected at their ends in series with the inner ends of the stems 13. Each stem may be provided with a pair of eyes 15 on its inner end for attachment of the springs, and by adjusting the nuts 14, the tension of the springs may be properly adjusted.

From the foregoing description it will be seen that relative endwise or rotary movement of the members 5 and 6 as well as relative swinging movement thereof will be permitted to a limited extent by swinging of the stems 13, while further relative movement will be yieldingly permitted by the springs 9. At the same time, the springs 9 provide a yieldable driving connection between the members or shafts 5 and 6 for avoiding jerks and strains.

It is believed that the construction and operation as well as the advantages of the invention will be readily understood and appreciated by those skilled in the art, from the foregoing description.

Minor changes may be made without departing from the spirit of the invention as claimed.

What is claimed is:

A universal flexible coupling comprising a pair of opposed outwardly and longitudinally extending arms being normally overlapped and arranged at right angles to each other, said arms provided at its free end with transverse openings providing hemispherical sockets in the outer faces thereof, hemi-spherical members universally movable in said sockets, threaded stems extending through each of said openings, springs connecting the same and means for properly adjusting the tension thereof.

In testimony whereof I hereunto affix my signature.

ROBERT EARL CARTER.